Figure 1:
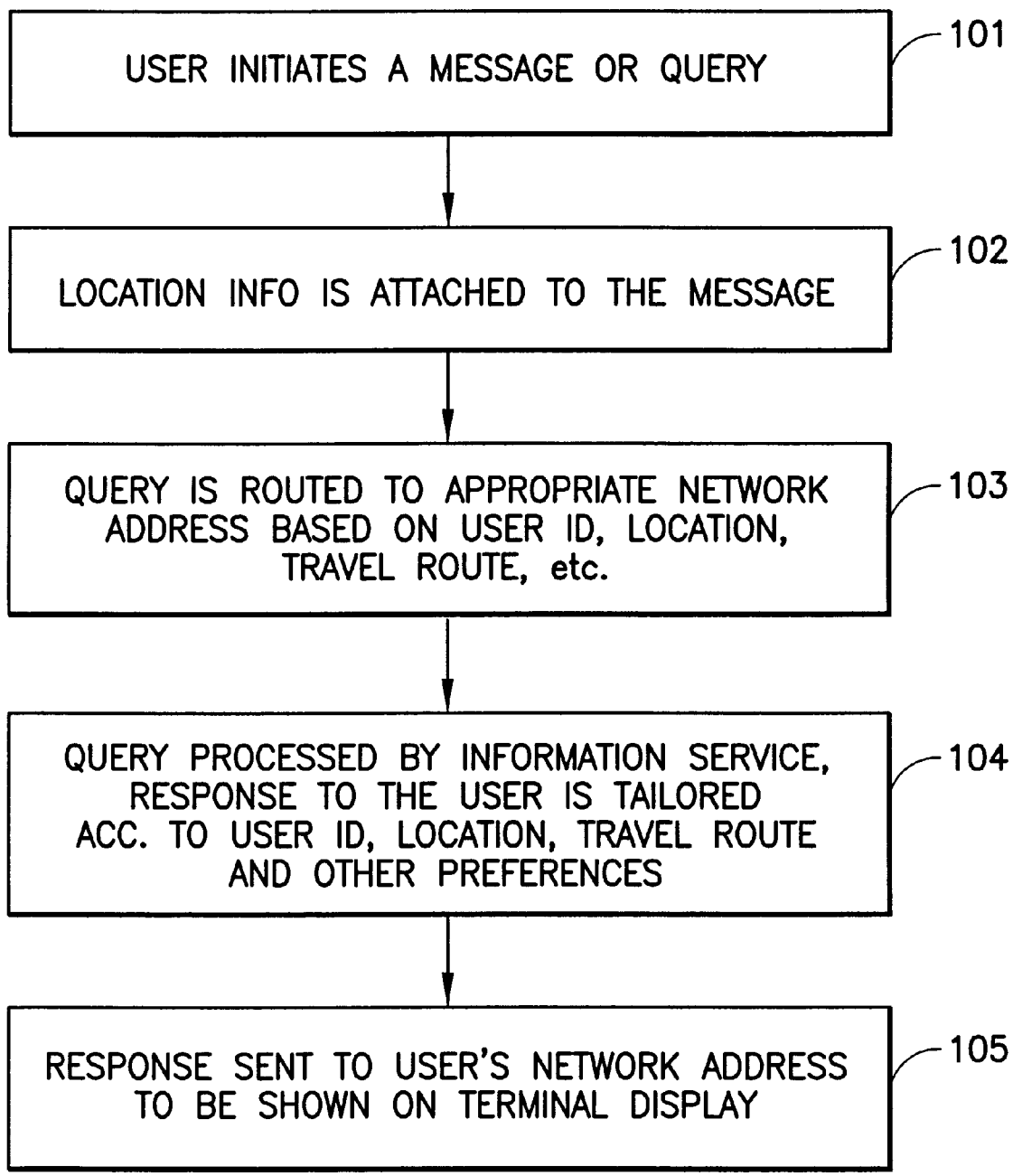

United States Patent [19]
Kari et al.

[11] Patent Number: 6,154,745
[45] Date of Patent: *Nov. 28, 2000

[54] METHOD FOR TRANSMISSION OF INFORMATION TO THE USER

[75] Inventors: Janne Kari, Helsinki; Heikki Rautila, Espoo, both of Finland

[73] Assignee: Nokia Mobile Phones Ltd., Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/996,578

[22] Filed: Dec. 23, 1997

[30] Foreign Application Priority Data

Dec. 31, 1996 [FI] Finland ..................... 965278

[51] Int. Cl.$^7$ ..................................... G06F 17/30
[52] U.S. Cl. ............................. 707/100; 707/10
[58] Field of Search ............... 707/1–10, 100–104, 707/200–206; 701/200, 208, 212; 705/14, 10, 26, 32; 709/219

[56] References Cited

U.S. PATENT DOCUMENTS

| | | | |
|---|---|---|---|
| 5,539,395 | 7/1996 | Buss et al. | 340/827 |
| 5,710,884 | 1/1998 | Dedrick | 395/200.47 |
| 5,754,787 | 5/1998 | Dedrick | 395/200.58 |
| 5,848,373 | 12/1998 | DeLorme et al. | 701/200 |
| 5,956,716 | 9/1999 | Kenner et al. | 707/10 |

FOREIGN PATENT DOCUMENTS

| | | |
|---|---|---|
| 0697670 A1 | 2/1996 | European Pat. Off. . |
| 0703463 A3 | 3/1996 | European Pat. Off. . |
| 2278196 | 11/1994 | United Kingdom . |
| WO 96/13951 | 5/1996 | WIPO . |

*Primary Examiner*—Ruay Lian Ho
*Attorney, Agent, or Firm*—Perman & Green, LLP

[57] ABSTRACT

Method for transmission of information to the user, in which a search terminal (1) is used for sending an information query, which is received and processed. Further in the method, information is searched for, and the retrieved information is transmitted to the search terminal (1). The information is received and displayed to the user by the search terminal (1). A system for transmitting information to a user comprises a search terminal (1) for sending an information query, means (3, 4, 4', 4") for receiving and processing of the information query, means (3, 4, 4', 4') for retrieving information, means (2) for transmitting the information to the search terminal (1), and means (1) for receiving the information and presenting it to the user on the search terminal (1), The information retrieval is arranged to be conducted at least partly on the basis of the location and/or travel route of the user.

20 Claims, 11 Drawing Sheets

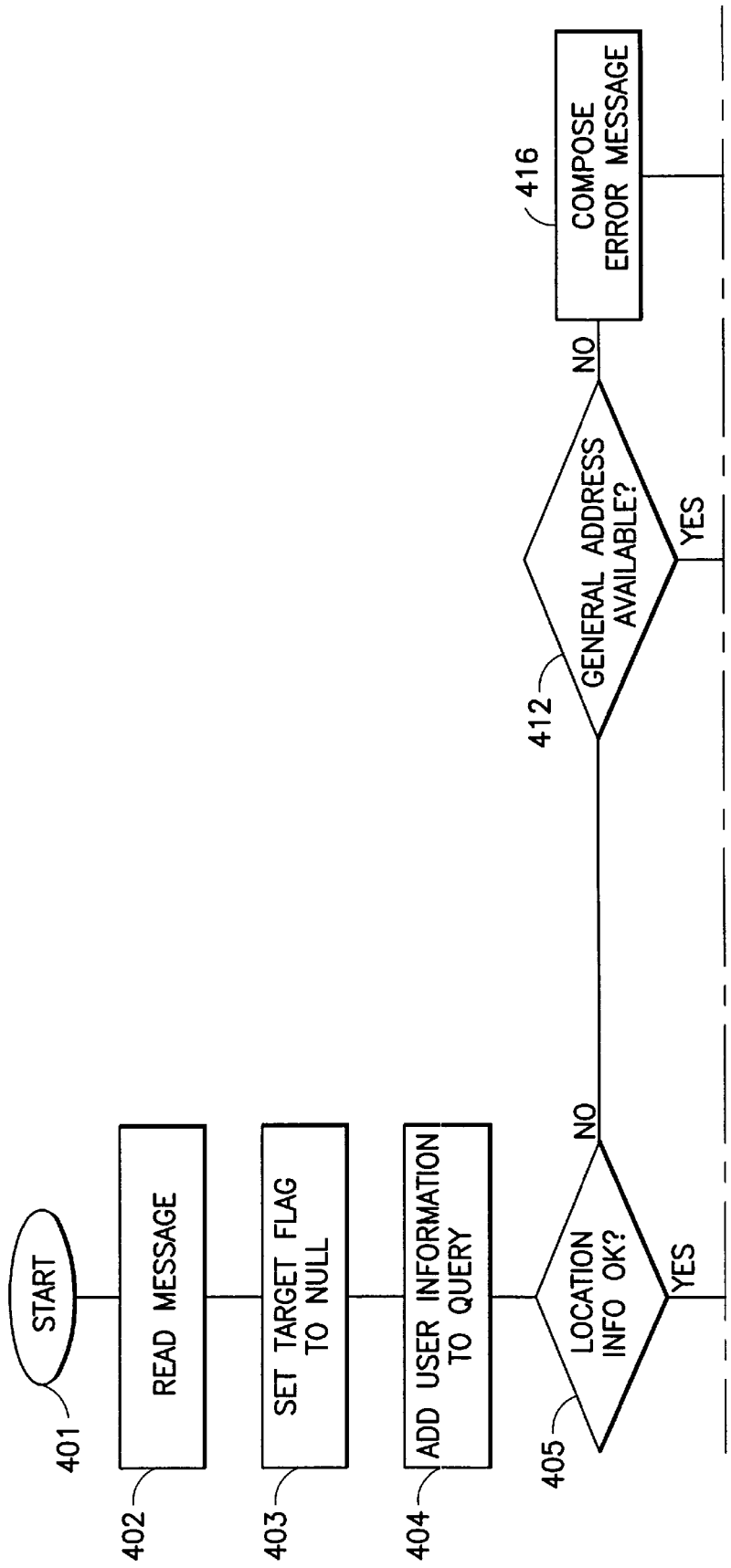

International Service, Inc.

Fill'er up query form

Resolved parameters

| Name | George McLaren | |
|---|---|---|
| Level | Normal | |
| Age | 45 | |
| Sex | m | |
| Cellular phone number | +358-50-123123 | |
| Class | Business | |
| Car | BMW | |
| Gas type | 99 | |
| Other info, search words | service, cafe | |

701, 702

Locate nearest:

☐ Fill'er up no service station
☐ Fill'er up 24H service station
☐ Fill'er up 24H service station with cafe
☐ Fill'er up Five Star Station
☐ Fill'er up Super Service Market

703

| Send query | Clear form |

704   705

FIG.7

International Service, Inc.

Fill'er up query form

Resolved parameters

| Name | George McLaren | |
|---|---|---|
| Level | Normal | |
| Age | 45 | |
| Sex | m | |
| Cellular phone number | +358-50-123123 | |
| Class | Business | 801 |
| Car | BMW | MB |
| Gas type | 99 | |
| Other info, search words | service, cafe | service, cafe, fast food, pizza |

Locate nearest:

☐ Fill'er up no service station
☐ Fill'er up 24H service station
☑ Fill'er up 24H service station with cafe
☑ Fill'er up Five Star Station
☐ Fill'er up Super Service Market

802

| Send query | Clear form |

FIG.8

METHOD FOR TRANSMISSION OF INFORMATION TO THE USER

The present invention relates to a method according to the preamble of the appended claim 1 for transmission of information to the user. The invention relates also to a system of transmission of information according to the appended claim 5 and a mobile station according to the appended claim 11.

Presently known methods for transmission of information, particularly to a mobile user, are most often based on the user calling by a telecommunication terminal to a supplier of services needed, such as to the service number of a service station. The user must thus know his or her location, which is used by the service supplier to find out which service station is closest to the user and to give this information to the user orally. For example in Finland one teleoperator makes use of a certain service number which the user can call to inquire orally how to find for example the closest hotel or service station of a certain company which is as close as possible to the location given by the user. During the call, an information search is conducted at the service number manually or from a computerized system. However, even if the system utilizes a data base stored in a computer, the information on the service to be searched for must be entered manually. Further, the user must know his or her location in order to find out the location of the closest service station.

European Patent Application EP-697670 discloses a data transmission system utilizing a computerized data base for information storage and search. The system presented in the publication is primarily intended for stores and shopping centres, wherein the data base contains stored information on the assortment of goods as well as the location of the items. Customers of the shopping centre can use a search terminal for inquiring the location of the article he or she is looking for, and possibly also the price and other information on the product. The search terminal is advantageously placed in connection with a shopping cart. The system can also comprise location means, wherein the location is conducted automatically and the customer does not need to enter the location data in the device. One disadvantage of the system presented in the published application EP-697670 is that the system is usable within a very limited area only, such as a shopping centre comprising a maximum of few stores. Also, the use of the system requires a sufficient number of customer terminals which must be paid by the merchant. Moreover, specific equipment must be mounted for locating, which will further raise the acquisition costs of the system.

Further, the systems of prior art involve the problem that there may not always be the product or service available that the user is searching for, whereby the user should think of a corresponding product or a service that the user might also use. However, in this case a new query must be made. On the other hand, the product or service asked for can be available at several different places, whereby the user must find out which is the best one with respect to his or her current location. This is not easy for example in a situation where the user is not familiar with the town and does not have a map of the town.

It is an aim of the present invention to eliminate drawbacks of prior art which are related to giving location data in the information query, formation of the query message, and directing the query message to a place where relevant data is most probably available, and to provide a method and system for transmitting information. The method of the invention is characterized in what will be presented in the characterizing part of the appended claim 1. The system of the invention is characterized in what will be presented in the characterizing part of the appended claim 5. Further, the mobile station of the invention is characterized in what will be presented in the characterizing part of the appended claim 11. The invention is based on the idea that for routing of the query message and searching for the information in a data base, the location information and possibly also travel route of the user are utilized. Further, the user profile of the user is used as a criterion for data search. The invention gives also the advantage that the user can be automatically informed when on the move.

The present invention gives significant advantages to the solutions of prior art. With the system according to the invention, the user is automatically informed of the services he or she wishes to have during the travel. Also, information can be searched on the basis of the user profile of the user, which will further accelerate information retrieval and excludes unnecessary information retrieval.

By using information retrieval based on the travel route, the information retrieval can be optimized in a way that the user is given the location of a service point which will incur as little deviation as possible from the planned travel route. Thus the user will not necessarily be informed of the closest service point but the one that suits best the travel route. In addition to this, also the closest service point can be given.

Another advantage of the invention is that if the desired article or service is not found on the basis of the query, the system will find a general address where the search can be made on the basis of the query.

Figures 3, 3A:
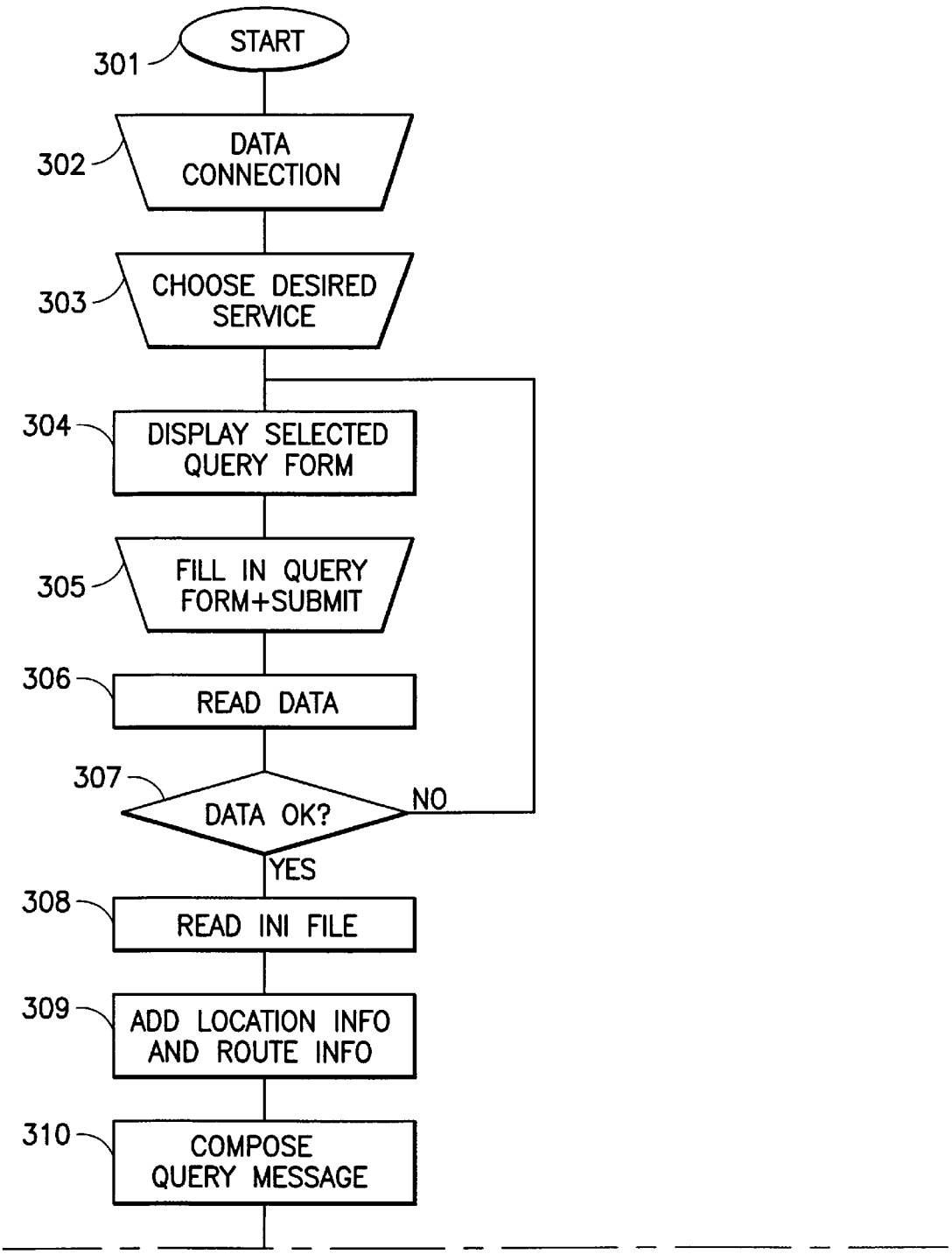
Figure 3B:
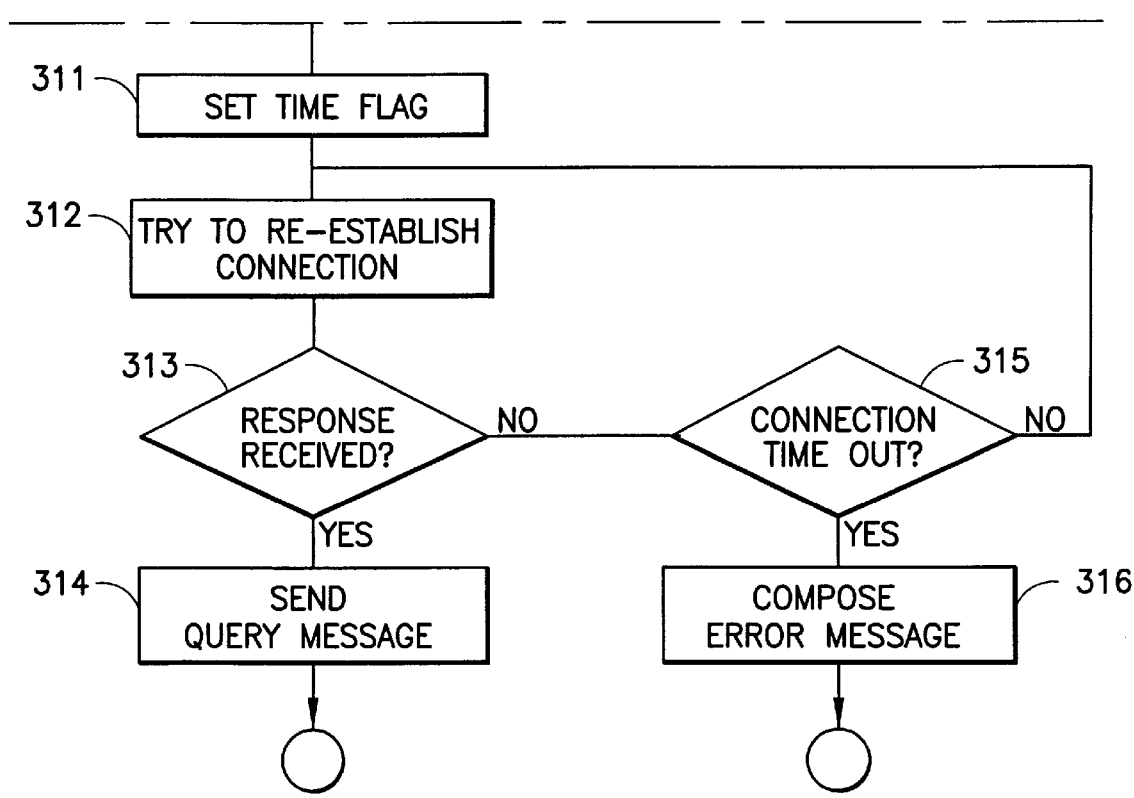
Figure 4B:
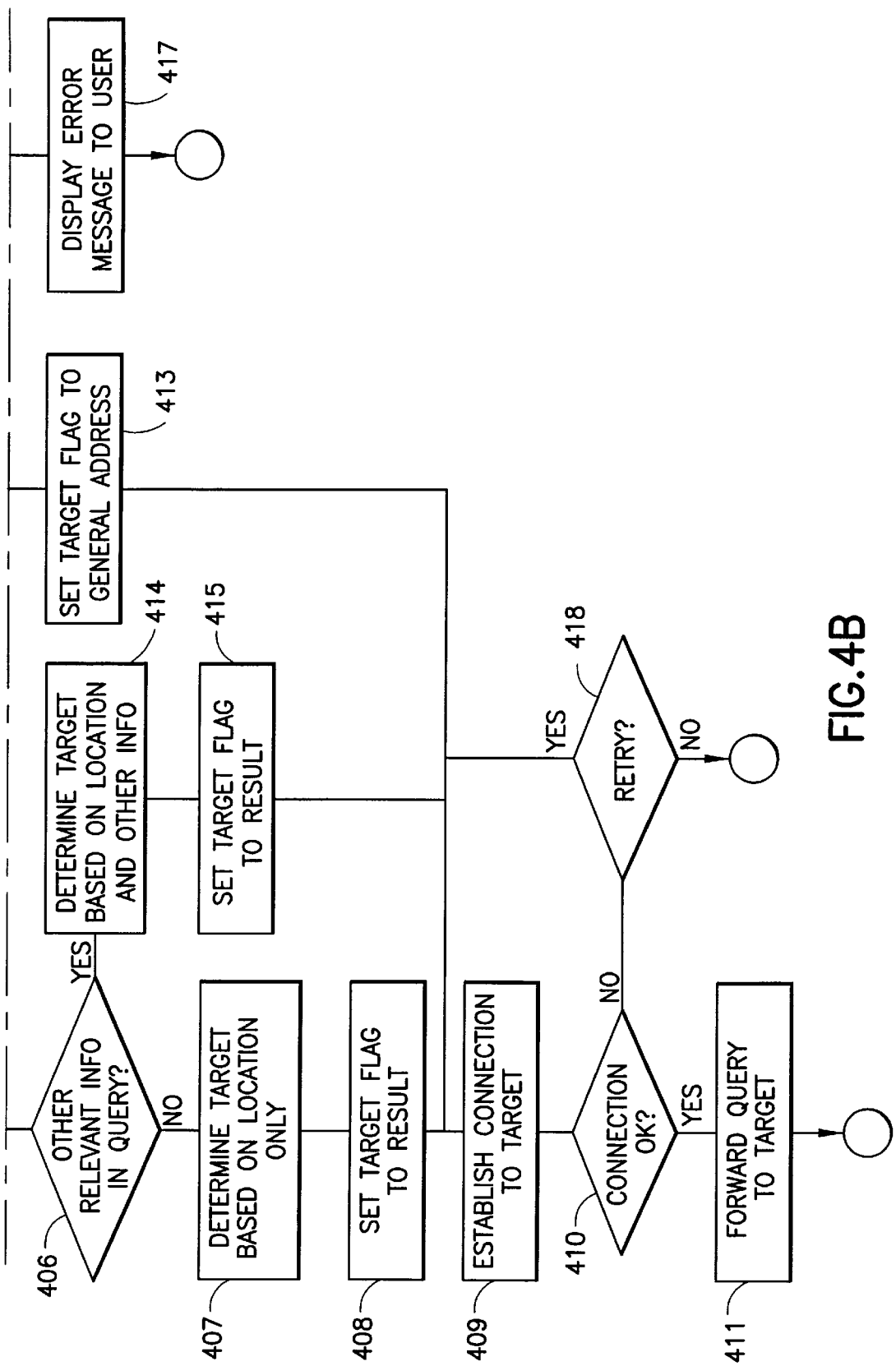
Figure 5:
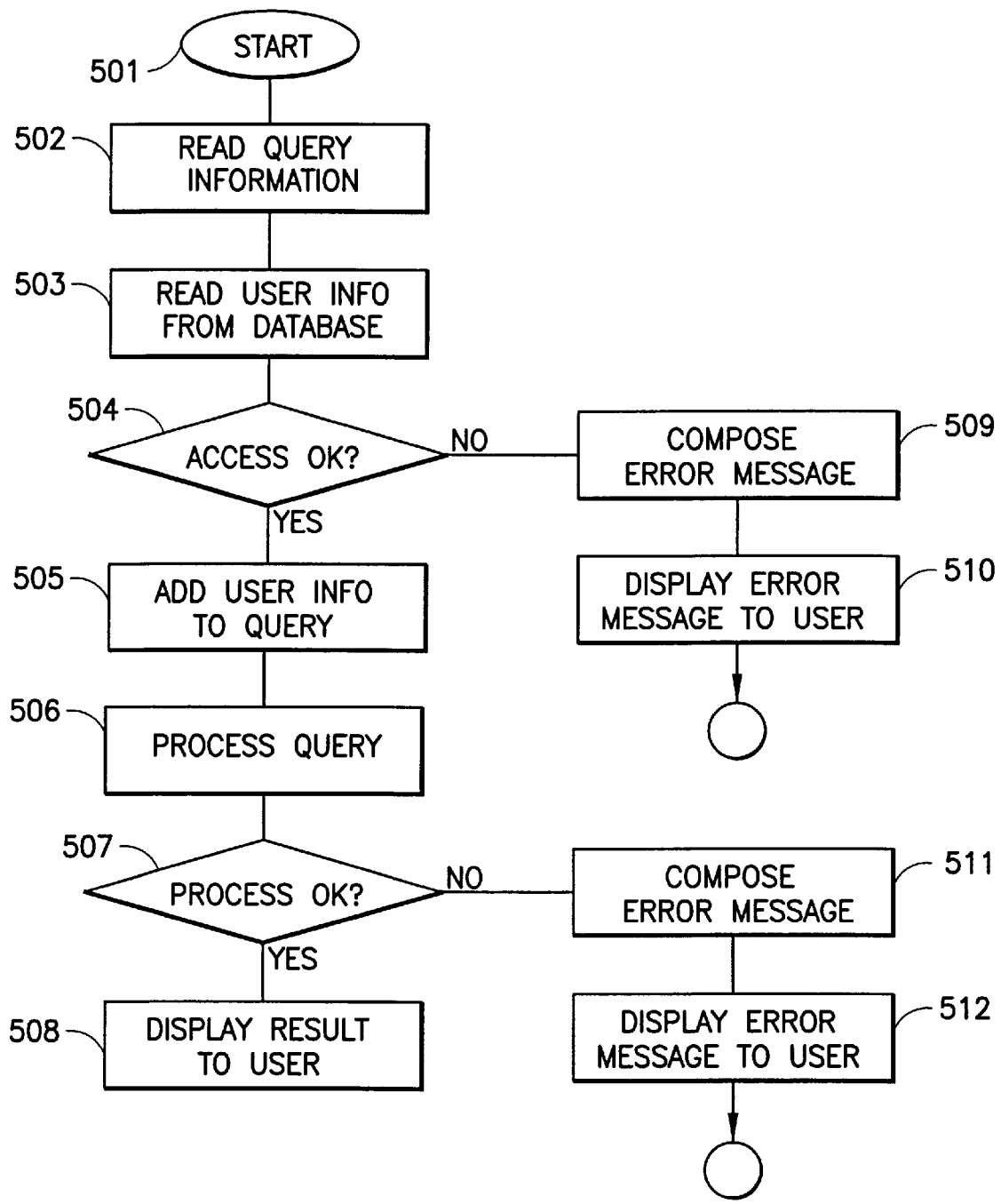
Figure 6:
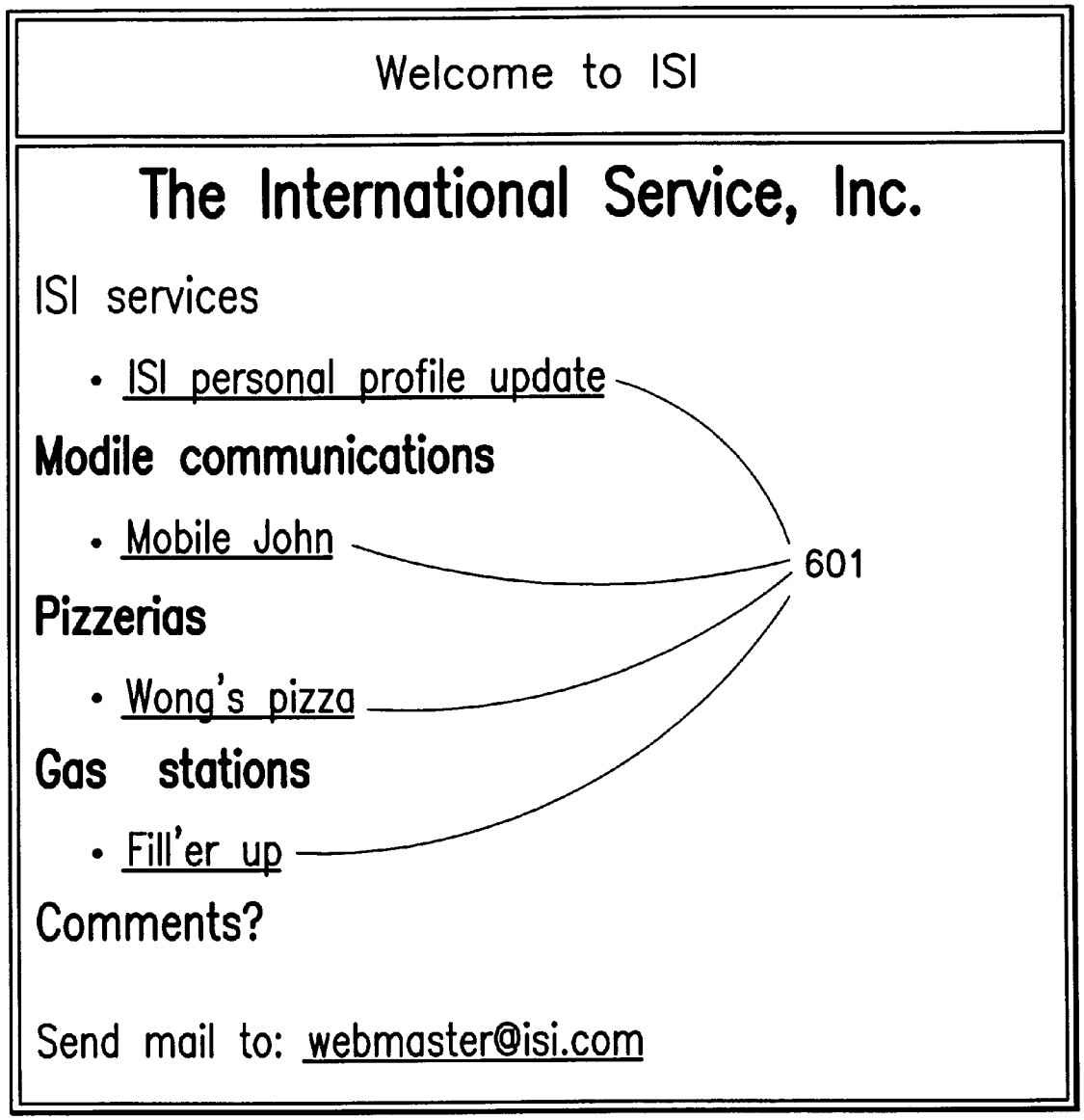
Figure 9:
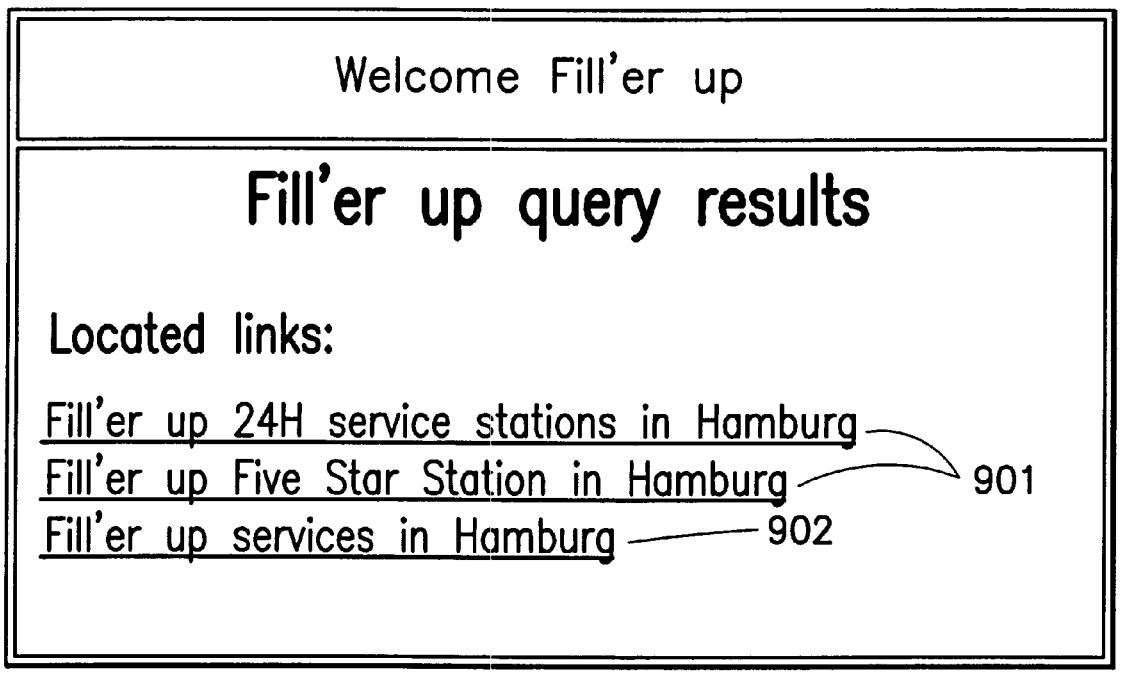

The invention will be described in more detail below with reference to the appended drawings. In the drawings, FIG. 1 is a reduced flow chart illustrating data retrieval from the file, FIG. 2 is a reduced block chart illustrating a system according to an advantageous embodiment of the invention, FIG. 3 is a flow chart illustrating the formation of a query message, FIG. 4 is a reduced flow chart illustrating the processing of the query message in a first connection server, FIG. 5 is a reduced flow chart illustrating the processing of the query message in a remote server, FIG. 6 shows an entry form used for forming a connection to a connection server, FIG. 7 shows a query form loaded from the connection server to the data processor of the user, FIG. 8 shows a query form filled in by the user, and FIG. 9 shows the presentation of results of a search conducted on the basis of the query to the user.

The application examples used in this description are based on properties of the GSM system (Global System for Mobile Communications), but the invention is not limited solely to this system but it can be applied also in other, advantageously at least partly wireless data transmission systems having a possibility of two-way data transmission.

Figure 2:
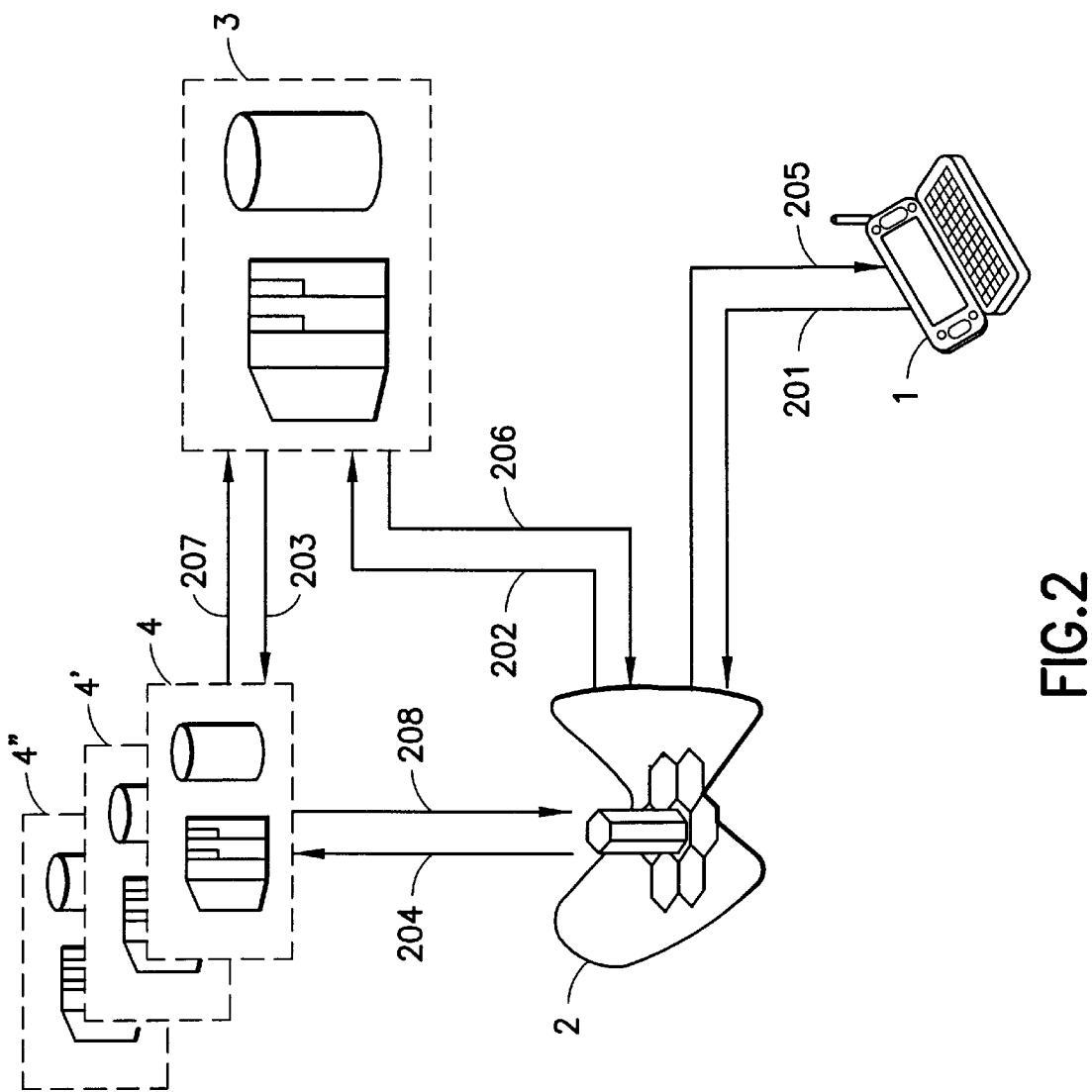

FIG. 2 is a reduced block diagram showing a system according to an advantageous embodiment of the invention. The user has a search terminal 1 comprising a telecommunication terminal, such as a mobile station. It is possible to make a data transmission connection from the search terminal 1 to a telecommunication network 2 which in this advantageous embodiment comprises a mobile communication network, such as the GSM mobile communication network. A connection server 3 and at least one remote server 4, 4', 4" are in a data transmission connection with the telecommunication network 2. There is also a data transmission connection from the connection server 3 to the remote servers 4, 4', 4" belonging to the system, either directly e.g. as a fixed connection or via the telecommunication network 2 advantageously as an optional connection. The system comprises also means for defining the location of each search terminal 1. The means for defining the location (not shown) are advantageously formed in the telecommunication network, but also a separate locating system can be used, such as the GPS system (Global Positioning System), or the location can be entered manually e.g. by using the search terminal 1.

The search terminal 1 used is advantageously a PDA-type teleterminal (Personal Digital Assistant) comprising advantageously means for data processing, means for transmitting voice, telefaxes, data, DTMF signals, and two-way paging. Further, the search terminal 1 can use satellite location means (GPS). A device suitable for the search terminal 1 is Nokia 9000 Communicator. The search terminal 1 can also be a mobile station with a data connector for connecting a computer in a data transmission connection with the mobile station. Thus at least part of the data processing operations of the search terminal according to the invention can be placed in connection with the data processor e.g. via a PCMCIA card (Personal Computer Memory Card International Association). For portable data processors, also PCMCIA cards comprising a satellite location receiver have been developed.

The search terminal 1 used can also be an ordinary microcomputer, or a so-called desktop PC having means for forming a data transmission connection with the telecommunication network 2. The means for forming a data transmission connection comprise most often a modem as well as telecommunication software for transmitting data signals, such as commands from the data processor to the telecommunication network and for receiving messages transmitted via the telecommunication network, as well as for using the messages for forming information on the display of the search terminal 1. One application program which has recently gained popularity is the web browser developed for the use of the Internet data network, wherein the user can search for information in the Internet data network, such as home pages (WWW pages) of companies and private persons.

When a desktop PC is used, the location information is advantageously stored permanently in the storing means of the desktop PC, or in case of using the GSM system or another mobile telecommunication system which can supply the location information to the mobile station for example as the number of a base station, the telecommunication terminal is connected to the system advantageously in a way that the location information can be updated from the mobile telecommunication system for example by means of application software controlling the system.

In the examples below in this description to clarify the invention, it is assumed that the user connection when coupling to the connection server 3 is a WWW page in the Internet. This user connection and the operations to be carried by the connection server 3 can be visible or non-visible to the user.

Further, it is assumed that also for connection to the remote server 4, 4', 4", the user connection is a WWW page in the Internet. However, the present invention is not limited solely to these embodiments, but in connection with the invention it is possible to use also other methods for forming a connection and application software, such as terminal software, known as such.

Further, in the examples describing the invention, the company used for supplying services is a multinational fictional company with the name International Services, Inc. (ISI), which maintains a connection server 3. The connection server 3 of the ISI company is arranged to transmit information from companies which have joined as clients of the ISI company, information from third parties, information on municipal services, etc. Companies and other parties offering services have signed an agreement with the ISI company for transmission of information via the connection server 3 of the ISI company. An arrangement of this kind is known e.g. in the Internet environment, in which also the costs are debited from the contracting parties, wherein the user of the system is not necessarily debited for use of the system. Thus it is primarily only the charge for the communication connection, such as local call charge, that remains to be paid by the user.

Thanks to the increased use of open data systems, the Transmission Control Protocol/Internet Protocol (TCP/IP) has become a general protocol which different computers can use for transmission of information. The TCP/IP support is presently available for almost all operating systems. The TCP/IP has a network layer protocol IP (Internet Protocol) intended for routing by gateways or routers. The routing is conducted with the help of four-bit IP addresses and routing tables. Thanks to the Internet protocol, computers using the TCP/IP can transmit messages in the router network as far as to the other side of the globe.

The Internet, which covers well particularly the industrialized countries, is a huge router network using the TCP/IP connection protocol. At present, the Internet connects more than 1.5 million devices and 20 million people. The largest group of users of the Internet, which was started for scientific use only, now consists of companies which buy their services from commercial connection suppliers, such as ISI in this example. In the Internet, each device has its own identifying IP address. The IP address is a 32-bit or four-byte figure which is divided by two into an organization-specific network address and a network-specific device address. For making the processing of addresses easier, a decimal, so-called point notation system has been introduced, in which the addresses are given in 8-bit figures (octet) divided with points. One octet is a figure from 0 to 255. This address mechanism is still divided into three different classes (ABC) which make it possible to use network and device addresses of different lengths.

For facilitating the use of the Internet data network, it is provided with a domain name service (DNS), in which each numerical address is assigned a certain alphanumerical character string. Thus for example the user enters the alphanumerical character string of a selected address, and this is converted by the domain name server to numerical form, whereafter a connection can be made to the selected address. This arrangement has the advantage that the addresses are easier to remember, because the addresses are usually designed to express some of the basic information of the service. For example, the address can be in the form www.firm.fi, and the corresponding numerical address can be 193.66.16.1. Further, links can be formed on the Internet pages, wherein it is possible to move via the link directly to the Internet page defined in the link.

The connection server 3 can, for example, be the mainframe of the company offering data transmission services, which can be linked in a data transmission connection with a telecommunication network 2. One example is that the connection server 3 is linked to the Internet system to operate as the Internet server. Thus the search terminal 1 can be in a data transmission connection with the connection server 3 via a so-called www (World Wide Web) page of the Internet.

From the connection server 3, a data transmission connection can be formed to remote servers 4, 4', 4" inter alia for transmission of query messages and replies to them. The data transmission connection between the connection server 3 and the remote servers 4, 4', 4" can be advantageously a landline or a wireless telecommunication network, or a fixed connection, such as the Ethernet data network. The remote servers 4, 4', 4" can be the same device as the connection server 3, or they can be even very far from each other, even on different sides of the globe. It should be mentioned that the connection server 3 and one or several remote servers 4, 4', 4" are not necessarily separate devices, but they can also be located in the same physical machine, such as a server mainframe.

Each remote server 4, 4', 4" contains information of a certain company or service, for example information on the locations and service supply of the service stations of a certain gas company. The remote server may have a separate user profile data base, which usually contains more detailed information on the user, and the user settings are more varied than in the user profile data base of the connection server 3. This means that the user has signed a user contract with the service supplier.

The remote server 4, 4', 4" can also check the rights of the user during set-up of the connection, as well as make other user-specific operations, such as give the user a chance to edit his or her user profile or a chance to log in other services offered by said remote server.

One of the most important functions of the remote server is to process a query entered by the user via the connection server 3. The connection server 3 may add user-specific information to the query and transmit the query message to the remote server 4, 4', 4" in question. The remote server will add more user information to the query from the user profile data base in the remote server, after which the remote server processes the received query message. The query message can also contain parameters changed by the user, as shown in FIG. 8. For formulation of the query, a query form stored advantageously in the search terminal 1 is used, as will be discussed below in this description.

If the remote server does not receive a separate query message, i.e. the user is for example connected via a terminal directly to the remote server, the remote server will display for example a list of alternatives to be selected by the user, wherein for acquiring further information, the user selects the desired alternative and the remote server will send information to the terminal on the basis of the selection by the user.

On the basis of the processing results of the query message, or on the basis of the selection entered by the user, an error message is shown in an error situation or the result of the query is shown in the positive case, either by display or by transmission of e.g. a short message to the user, for example to the display means of the telecommunication terminal of the user.

The system according to an advantageous embodiment of the invention comprises a computer network address, such as IP address, which is stored in the search terminal 1 of the user. This address can be either fixed or it can be updated manually or via a data transmission connection, either by landline or in a wireless manner. One practical solution for updating this address is the use of a short message service (SMS) known from the GSM mobile communication system. This address information is used for setting up a connection from the search terminal 1 to the connection server 3. A typical address item is the telephone number of the service supplier, to which the connection server 3 is connected. Thus the data transmission connection can be set up e.g. via a modem by dialling the telephone number in question. The search terminal 1 will do this dialling automatically on the basis of the address information stored in the search terminal.

In addition to the above-mentioned address information, it may be necessary to transmit also other information, either compulsory or optional for setting up a connection, such as the IP address, a network mask, etc. In the embodiments presented in this description, the IP address information is not transmitted to the user, because this is not important. If other forms of connection than WWW is used, it may be necessary to transmit also the corresponding IP information to the user e.g. in a short message.

Information on the real-time location of a mobile communication device can be derived to the search terminal from the GPS system or another satellite location system or via the positioning service of a mobile communication network. If a desktop PC or the like is used as the search terminal 1, whose location is not usually changed very often, the location information can be stored e.g. in a text-form file where the information can be retrieved and edited by the user.

At the stage when the user initiates the query (FIG. 1, block 101) by setting up a connection via the telecommunication network 2 to the service, the location information, the identification of the terminal or the user, and possible information on the travel route is included in the query message (block 102) which is transmitted to the service. The messages or inquiries sent from the search terminal are routed to the appropriate network address (block 103). For routing, the user identification, the geographical position of the search terminal 1, the travel route selected by the user or noticed by the search terminal 1, or any combination of these is utilized.

In the system according to the invention, the reply to the query message can be formed on the basis of the user identification, the travel route and the geographical location of the search terminal 1 (block 104).

In the method according to the invention, the user uses the search terminal 1 to formulate a query message defining the search profile of the service or the like to be searched for. For this purpose, a blank form is advantageously loaded or stored in the search terminal 1 to be used for entering the information. Part of the fields can be pre-filled on the basis of information on the user profile. Thus the user changes the items for defining the information to be searched for. A suitable blank form for this purpose can be designed as an Internet-type WWW page, as shown in FIG. 7. The search terminal 1 sets up a data transmission connection to a connection server 3. The data transmission connection is preferably a two-way data connection, wherein data to be transmitted from the search terminal 1 can be sent to the connection server 3, and the data sent by the connection server 3 to the search terminal 1 can be received at the search terminal 1. The set-up of the data transmission connection can be conducted naturally so that the address information, such as the telephone number and web address, of at least one connection server 3 is stored in the memory of the search terminal 1, wherein the search terminal 1 forms a data transmission connection by using this telephone number and web address.

FIG. 3 is a flow chart illustrating an advantageous embodiment for forming a query message. The user uses the search terminal 1 to start a terminal application (block 301), which in this example is a WWW browser. The user starts connection set-up to the connection server 3 in block 302, and after the connection is set up, the WWW page is displayed in the display device of the search terminal 1. The WWW page shows the services to be selected and/or links to these services. The user selects the desired service (block 303). Next, the connection server 3 displays the query form corresponding to the selected service (block 304). The query form contains basic information searched from the user profile of the connection server 3, and these are displayed to the user. At this stage, the user can freely fill in the text fields and mark the option boxes desired, select possible additional alternatives, etc. (block 305). The user can enter the information on the location and/or the travel route manually and give further entries for identifying the services to be searched for. After the query form is loaded on the display of the search terminal 1, the connection to the connection server 3 can be cut for saving data transmission costs (not shown in FIG. 3).

After the user thinks that all the necessary data is adequately filled in, the user selects data transmission advantageously by pointing at a transmission selection button or the like formed for this purpose in the query form (e.g. OK button). Button selection is known as such from many computer application programs in which selection is made by pointing the cursor with a pointer means to the button selected and by pressing the selection button arranged in connection with the pointer device. After selection of transmission, the browser reads the information contained in the query form (block 306). Next, the application program conducts error correction (block 307). At this stage, the application program checks on the basis of HTML codes which values are compulsory and which are optional. If any of the compulsory values is missing or erroneous, for example letters are entered in a numerical field, the application program will automatically return to block 304 or alternatively display an error message and then return to block 304. The user must then reload the form either from the memory means of the search terminal 1, if it was stored, or by setting up a new connection to the connection server 3 by loading the form from the connection server 3. The search terminal 1 can also have a cache to be used for accelerating the operation. If the form is stored in a cache, it can be retrieved from there.

Also, the operator of the connection server has usually installed an application software in the connection server 3 for checking correctness of the given data and deficiencies which do not comply with the HTML codes. This is prior art, so it is not necessary to deal with it in more detail in this context.

In case the form is filled in correctly, the application program will move on to block 308, in which the user information, or the so-called initialization file, stored in the storage means of the search terminal 1 is read into the random access memory of the search terminal 1. Preferably only those values which are not defined in the query form are read from the initialization file. Thus the user can define temporary values which replace the values stored in the memory. This is practical for the user in situations deviating from the normal, for example when travelling in another vehicle or car.

Next, the application program reads automatically the information on the location and/or on the travel route (block 309). As was presented above in this description, the information on the location can be determined e.g. by using GPS equipment and changed into a form suitable for the application program. This is not necessary, if the user has filled in the information on the location and/or the travel route in block 305.

Now all the required information is compiled, wherein the application program forms a query message on the basis of the information to be transmitted to the connection server 3 (block 310). The query message is for example a message complying with the HTML language.

The application program sets a time flag in block 311. This is to control that if a connection is not set up within a predetermined time to the connection server 3, the operation is interrupted and the user is informed of the error in an error message. The application program starts to re-establish connection in block 312. In block 313, it is checked if the connection is set up, i.e. if the connection server 3 has sent a response to the search terminal 1. If a response has not yet been received, it is examined in block 315 if the time limit has been passed or if there is still time to wait, in which case the procedure is continued in block 312.

After the search terminal 1 has received a response from the connection server 3, i.e. the connection is established, the search terminal 1 starts transmission of the query message to the connection server 3 (block 314).

The query message sent from the search terminal 1 is processed in the connection server 3 (FIG. 4), which inter alia on the basis of the content of the query message selects the suitable remote server 4, 4', 4" for processing of the query message. Next, the connection server 3 transmits the information of the query message to the remote server 4, 4', 4" selected, and possibly adds also user-specific information available in its own user file to the query message.

The connection server 3 has further a file containing information on remote servers 4, 4', 4" maintained by service suppliers incorporated in the system, as well as on other parties offering services or information through the system. Said service database is used at the stage when the content of the query message is examined for finding out the most adequate remote server 4, 4', 4". The service database contains information on other remote servers 4, 4', 4" belonging to the system, for example in a manner as shown in Table 1. Table 1 presents four records from the service database of the connection server 3. Each record is given as one column in Table 1, in which:

| | | |
|---|---|---|
| ID | = | identification of the service provider, such as the name of a company, |
| Location | = | geographical location of the service station, |
| Country | = | country, |
| IP | = | network address, in this case the numerical address according to the Internet Protocol, |
| HTTP | = | home page address of the supplier of the service in question (WWW page), |
| Search Words | = | key words, and |
| ISI class | = | classification defined by the operator of the connection server 3. |

The connection server 3 processes the query message and compares the information given in it to the service database of the connection server 3. On the basis of the comparison the connection server 3 attempts to find a record which corresponds best to the information asked for, i.e. information on the service. The query can be based either on the location of the user or other data, such as the service to be looked for, key words, classification, or any combination of these.

If the search results in finding one record, whose information corresponds to the information used as a basis for the search, the connection server 3 establishes a data transmission connection to the remote server 4, 4', 4" which in the selected record has been defined as the remote server of the service in question. In some cases, the search gives several records whose information corresponds to those looked for. Thus the connection server 3 displays advantageously a list of records which were found interesting in the search. The list is displayed with the display means of the search terminal 1, wherein the user can select the most attractive service from the list, wherein the connection server 3 establishes a data transmission connection to the remote server 4, 4', 4" corresponding to the selected service. However, the search does not always give a record which is suitable or close to suitable, wherein the connection server 3 directs the query message to a server where some information related to the content of the query message is available.

If the search gives no such record whose information would correspond to the query message to a sufficient degree, the user is informed of this advantageously by an error message transmitted by the connection server 3 to the search terminal 1 and displayed by the display means of the search terminal 3. Thus the user may for example reformulate the query, if necessary.

The user profile of users of the search services stored in the connection server 3 contains at least the user identification, such as user name, password, etc., user default values for each service, and possibly also other service-specific settings. The user profiles can be e.g. stored in the data base of the connection server 3, wherein the connection server 3 uses said file to find out which remote server 4, 4', 4" each query message should be directed to. The appended Table 2 gives an example of a user profile data base showing the user profile data base of a gas company for some registered users. The information is given in columns in Table 2, wherein the lines indicate as follows:

| User ID | = | user identification, |
|---|---|---|
| Name | = | user name, |
| Password | = | password, |
| Level | = | level of experience, |
| Age | = | age, |
| Sex | = | sex, |
| Cell phone | = | telephone number of mobile station, |
| Class | = | classification of the service supplier, |
| Car | = | car model, |
| Gas type | = | fuel type, |
| Other | = | further information. |

It is also possible that the connection server 3 is arranged to operate as a generally used server, in which case the connection server 3 does not necessarily contain user-specific information. Thus the user must give all the necessary information in the query message, or the connection server 3 can contain some predefined settings for users of different kind, of which the user can select the most suitable.

If the connection server 3 does not have a user profile data base, the query can be processed on the basis of other information transmitted in the query message in order to find the adequate remote server. Also the remote servers 4, 4', 4" can have their own user profiles irrespective of whether a user profile data base is available at the connection server 3 or not. Having a user profile data base at the remote server is advantageous particularly in a situation that the connection server 3 transmits information on services of a very different kind.

The query is used at the stage when the user forms a connection to the connection server 3. The query comprises a query message which contains advantageously the following information:

information on the location, information on the travel route, values that can possibly replace the values stored in the user profile of the user, additional user-specific information which is not stored in the user profile data base of the connection server 3.

After the user has filled in the necessary information in the query form, the user gives the search terminal 1 the command for transmitting the query message. Next, the search terminal 1 advantageously sends the information contained in the query form to the connection server 3, which form the query message on the basis of the information in the form and possibly also on the basis of user profile information. Formation of the query message is described below in an example. The query message can contain for example the following information:

| | |
|---|---|
| UserID="McLarenGeorge" | user identification or user name, |
| Location="N60°22'30"E20°22'30" | location of the user, value retrieved e.g. from the GPS system, |
| Route="NE" | direction of travel of user (North-East), which value is also retrieved e.g. from the GPS system or is entered manually in the query form, |
| Override="temp" | the value "temp" indicates here that the values entered later replace possible corresponding values in the user profile temporarily, i.e. during this query. Instead of the value "temp", the value could be "perm", wherein the following values would permanently replace the values stored in the user profile, i.e. the content of the user profile is changed, |
| Car="MB" | the user is in a vehicle which deviates from the normal, e.g. in a rented car. This value is given instead of the value stored in the user profile during this query, |
| GasType="Diesel" | the fuel for the vehicle is diesel oil, |
| SearchWords="cafe,repair" | the user wishes to find a gas station which offers the services given in the search words, i.e. a cafe and repair services. |

For application of the present invention, it is not significant as such in which form the query message is transmitted in reality, but the message structures may vary to a considerable extent in different applications. What is primarily significant is that the content of the query message is sufficient for finding out information in the data bases stored in the connection server 3. In this example it is assumed that the query message is transmitted using the Hyper Text Transfer Protocol (HTTP) known from the Internet environment, wherein the query message composed of the values given in the above example is as follows:

http://www.isi.com/query?UserID=
McLarenGeorge&Location=N60°11'3&Location=
E20°22'30&Route=NE&Override=temp&Car=
MB&Gas Type=Diesel&SearchWord=
cafe&SearchWord=repair One type of presenting the location information was given above (N60°22'3; E20°22'30), but in this context, also other types of known geographical co-ordinate systems can be used. The location of the user or the search terminal 1 can also be given with reference to the base station numbering of the mobile station system, wherein the location is given as the number of the base station in which covering area the search terminal 1 is at the time. This method is also applicable in situations in which the search terminal 1 comprises a mobile station and the connection from the search terminal 1 to the connection server 3 is established by using said mobile communication network.

Also the travel route can be given in different ways in the query message. The travel route is given preferably manually so that the user gives the destination town or the geographical co-ordinates of the destination. The travel route can also be given by using co-ordinate data given by the GPS system or the like during the travel, and the co-ordinates of the intended travel route are calculated at certain points, preferably at least at the destination. As shown in the above examples, the travel route can also be given as the points of the compass, in which direction the user is moving.

The block diagram of FIG. 4 shows an advantageous embodiment for processing the query message in the connection server 3. Having received the query message (block 401), the connection server 3 reads it into its memory (block 402) and store the message preferably for the time of its processing. The connection server 3 has a storage memory location or the like for locating the address of the remote server which is possibly obtained as a result of the query. This memory can be for example a random access memory (RAM), from which a required part is reserved for the use of the application software. The memory location for storing the remote server address, which in this context is called a target address, is first set blank in block 403.

The connection server 3 may contain information on users who have registered as users of the search service. In block 404, user-specified information stored in the connection server 3 is added to the query message. If the message sent from the search terminal 1 contains information corresponding to the user profile of the connection server, the values received with the query message are preferably used instead of the values in the user profile. Next, the information on the location of the user is checked in the connection server 3 (block 405). At this stage, it is checked e.g. if the location information is necessary or if the definition is deficient. If the location information is required, its existence, form and accuracy is checked. If the check-up shows that the location information does not fulfil the requirements, the operation moves on to block 412.

In block 412, the connection server 3 attempts to find out a remote server 4, 4', 4" of the type of a general server which can be used in a situation where the location information is not available or it is not needed. If such a remote server is found, the address of this remote server is set as the target address (block 413), after which the operation moves on to block 409. If a suitable remote server is not found, an error message is generated (block 416) and displayed to the user (block 417).

If the location information of the query message is found to be formally correct, the operation is continued in block 406, in which, if necessary, other information on the query message is checked particularly to find out if there is still some information in the message that should be taken into account when looking for the adequate remote server.

Particularly the travel route, the search words given by the user and the service classification should be taken into account.

If the query message received at the connection server 3 does not have any other information needed, the operation moves on from block 406 to block 407. In the other case the operation is continued in block 414, in which the connection server 3 uses other information of the query message to find out the adequate remote server 4, 4', 4' preferably by using the location information as the primary search criterion and using the other information of the query message in a predetermined order as additional search criteria. This order is service-specific and it does not have any significance for the application of this invention, so that it is not necessary to discuss the order criteria further in this context. In block 415, the target address is set as the address of a remote server whose information is as close as possible to the search criteria of the query message. After this, the operation is continued in block 409.

In block 407, only query messages are processed, in which the relevant search information is based solely on the location of the user. Thus the connection server 3 attempts to find out a remote server 4, 4', 4" containing the service or services closest to the user. The address of this remote server is set as the target address in block 408, after which the operation is continued in block 409.

In block 409, the target address obtained as a result of the above-mentioned searches is used for setting up a connection to the remote server 4, 4', 4" in question. Next, in block 410 it is checked if the connection to the selected remote server can be established. If connection set-up is not successful for example because the selected remote server 4, 4', 4" does not reply for any reason, it is checked in block 418 if a new attempt is to be made to set up a connection or if the set-up is to be interrupted. Here, for example a time counter or a recall counter is to be used, in which case a connection is attempted until successful, if the time set in the time counter or the maximum call number of recalls is not exceeded. If connection set-up is not successful, an error message is advantageously formed and displayed to the user.

In the case that a connection from the connection server 3 to the selected remote server 4, 4', 4" is successful, the operation is continued in block 411, in which the query message is transmitted further to the selected remote server 4, 4', 4".

FIG. 5 is a reduced block diagram illustrating the processing of a query message in a remote server 4, 4', 4" according to an advantageous embodiment. The operation is started in block 501, in which the query message is received from the connection server 3. The information contained in the query message is read into the memory of the remote server in block 502. As known, the memory used can be for example a random access memory (RAM), as described above in connection with the connection server 3.

On the basis of the information in the query message, the remote server retrieves the remote server-specific user information of the user who made the query from the user profile data base of the remote server. Also the remote server utilizes preferably information received with the query message instead of information contained in the user profile data base of the remote server, in case there is overlapping information. This is advantageous particularly in situations when the information given by the user differs from the normal definitions of the user.

Next, the remote server checks the user rights of the user in question (block 504). At this stage, also other special checkings related to the service can be made. Information contained in the user profile data base of the remote server is compared with the information received in the query message, particularly the password and the user name.

If for any reason the user rights of the user do not comply with the information stored in the remote server or the entry of the user to the remote server is denied for some other reason, an error message is formed (block 509) and displayed to the user (block 510). After this, the processing of the query message is interrupted.

If the entry rights of the user are all right, the information retrieved from the user profile of the remote server is added into the query message in block 505 and the query message is processed in block 506.

At this stage the query message is ready to be processed in the remote server. Also in this processing, the most important search criterion used is preferably the user location, if it is given in the query message. Thus the remote server finds out the location of the searched-for service that is closest to the user. Also other search criteria can be used for determination, such as the travel route and/or information contained in the user profile, search words, etc. The search criteria to be used at the time and their priority is service-specific and does not have significance in application of the invention.

The next step is to examine the result of the processing of the query message (block 507). If the query resulted in more than one possible service, these are displayed to the user advantageously in the form of a list (FIG. 6), from which the user can select the desired service (block 508). After this, the operation is ended in these respects.

However, it is not always possible to find any such service which would comply sufficiently well to the information in the query message. Thus an error message is formed (block 511) and displayed to the user (block 512). After this the query is finished.

The query message can also be formulated manually by using button operations or the like of the search terminal 1. However, this is a rather laborious alternative, because the user must remember exactly the written form of the necessary identifications in order to formulate a fully correct query message exemplified above. A useful method for forming a query message is that for example the supplier of each service provides the user with an application program, the interface of which comprises advantageously a questionnaire in which the user can enter the information needed. Having entered the required information the user accepts the form, after which the application program forms a query message on the basis of the information given in the form, for example a HTTP type message. The application program can also be provided by the operator of the connection server 3 particularly for applications where a uniform questionnaire can be used, or there can be few alternative blanks, of which the best suitable for the query is selected at each time.

Still another advantageous alternative is to utilize the possibilities offered by the Internet. A useful solution is thus that the connection server 3 has a predefined WWW page or form containing the information for forming a query message. This method has the advantage that the user can load the WWW page from the connection server 3 and store it locally for example in the storing means of the search terminal 1, such as a hard disk or non-volatile random-access memory. Thus the user does not need to load the WWW page each time for forming a query, to save money and time. If changes are made in the WWW page by the connection server 3, a notice is advantageously sent to each user registered to the connection server 3 in question, wherein the users can load the amended WWW page and store it to replace the previous version.

At the stage when the user wants to make a query, the WWW page is loaded for example with an Internet browser and the questionnaire is filled in for the relevant parts. After this, the application program automatically forms a query message and sends it advantageously as a short message (SM). In the case that the WWW page is not stored in the storing means of the search terminal 1, the questionnaire is loaded in connection with each query when connecting to the connection server 3.

Storing the questionnaire in the storing means of the search terminal 1 is advantageous particularly in situations in which different types of questionnaires are not needed, for example when the connection server 3 is used for transmitting information of the services of only one supplier. Usually, however, the connection server 3 is used more generally, for example having said ISI company as an example, wherein information can be retrieved via the connection server 3 on several different types of services and service suppliers. In such a case it is often necessary to use several different types of questionnaires, wherein the storage of the questionnaires in the storing means of the search terminal 1 may not necessary be preferred.

Having filled in the questionnaire for the relevant parts, the user notifies the application program that the form is ready to be transmitted. After this the application program combines the entered information and forms a query message for example according to the hyper text mark-up language (HTML) and HTTP definitions to be transmitted to the connection server 3. At this stage the application software also checks that all the required parts of the questionnaire are filled in correctly. If there are mistakes or deficiencies, the application program forms an error message on the display of the search terminal 1 and requests the user to fill in the form again.

If the questionnaire used was a form stored in the storing means of the search terminal 1, connection set-up is started to the connection server 3 after the form is correctly filled in. At this stage the query message is also provided with the location information, obtained e.g. from a GPS system or a mobile communication system. When the GPS system is used, the search terminal 1 is advantageously equipped with an application program for finding out the location information and transmitting it to the browser for adding to the query message.

At the stage when the query message is formed, it can be transmitted to the connection server 3. The transmission can be conducted either automatically or by the user for example by pressing a predetermined button or by selecting an accepting button on the display (e.g. the OK button).

The processing of the query message in the connection server 3 will be described below. Having received the query message from the search terminal 1, the connection server 3 checks up the content of the query message and, if necessary, arrests further operations for example because of a false user identification or password. The check-up can also be conducted at the stage when the connection server 3 has formed a connection to the remote server 4, 4', 4" selected by it. In this alternative, the connection server 3 does not necessarily check the user rights of the user but transmits the message further. If the further processing of the message is arrested for example because of deficiencies in the user rights, the user is notified of this e.g. with a short message transmitted to the search terminal 1, wherein the search terminal 1 displays the message on the display means.

From the query message sent from the search terminal 1, the reply path is picked up, i.e. the address to which the replies to the query and possible error messages are to be sent. For example the short message service (SMS) of the GSM mobile communication system comprises the possibility of providing the short message with identification information of the sender, on the basis of which the reply path can be found out. The reply path is stored in the user data base either by the connection server 3 or the remote server 4, 4', 4", to which the connection server 3 transmitted the query message.

There may be many reasons for preventing the entry of the query message sent by the user search terminal 1 to the service of the remote server 4, 4', 4". Many service suppliers require that a user is registered as a user of the service, wherein an unregistered user is not given the chance of using the service in question before registration. The user can also enter his or her name, identification code or password incorrectly, which will also prevent the use of a service for which the entry of these data is required. Still another reason for not establishing a connection to the remote server is the fact that the location information is missing or it is given in an incorrect or incomplete form. On the other hand, entering too many parameters may prevent further processing in a remote server, or the fact that the query message contains parameters which are not recognized by the remote server. Also the lack of some parameters or incorrect parameter definitions may prevent further processing of the query message.

After the query message is recognized to be correct and the user is identified as a registered user, the processing of the query message can be started. The information given in the query message is taken into account advantageously by processing the parameters in a certain order of priority. For applying the invention, the most advantageous order of priority is that the user location information is the primary criterion for selecting the service of the remote server. Next, the travel route is observed. The next criteria are temporary user profile definitions possibly given by the user, and the content of the user profile stored in the connection server 3. Further, possible other parameters defined by the user can be taken into account, such as search words, which are marked with the reference numeral 801 in the questionnaire shown in FIG. 8.

On the basis of the information given in the query message and the order of priority, the connection server 3 conducts a search in its own data bases for the service or services complying best with the query message. The connection server 3 forms a reply message to be transmitted to the search terminal 1, the message giving the service or services selected by the connection server 3. The reply message can be for example a short message or several short messages, of which the search terminal 1 collects the relevant information and forms a message on the display, such as a list on the services selected by the connection server 3 as a result of the processing of the query message. After this, the user can select the most suitable service, wherein the search terminal 1 starts connection set-up to the selected service. The practical implementation how the connection is established depends e.g. on the type of data communication connection available from the search terminal 1 to the connection server 3 and/or remote servers 4, 4', 4".

The purpose of the remote server 4, 4', 4" is primarily to provide information for example on a certain company or service. The remote server may have a separate user data base, as presented above in connection with the description of the operation of the connection server 3. The user data base of the remote server may contain more detailed information on the user, more specific user settings, etc.

Also the remote server 4, 4', 4" may check the user rights of the user, if necessary, and conduct other user-specific operations, such as give the user a chance to change his or her own user profile or register as a user for other services of the remote server in question.

The most important function of the remote server 4, 4', 4" is further processing of the query message received via the connection server 3. As disclosed above in this description, the connection server 3 can add user-specific information to the query message and transmit it to the remote server selected by it. The selected remote server adds user-specific information from its own user profile data base to the query message, after which the remote server processes the query message.

The user can establish a connection to the remote server also directly through the terminal or the like, in which case no specific query message is transmitted. Thus the remote server displays for example a list of selection on the display means of the search terminal 1 of the user, wherein the user can select the most suitable from the list.

After processing of the query message or selection by the user, the search terminal 1 is given a message showing the result of the search in a positive case. In an error situation, an error message is displayed. The reason for an error situation can be for example that there is no such service available in the remote server that is referred to in the query message. Transmission of messages can be conducted as above, for example by using one or several short messages or by another method of communication, known as such.

In the method of the present invention, the user him- or herself does not need to search for the service needed nor to find out his or her location. The user can thus automatically obtain information for example on restaurants and accommodation services, car repair services, gas stations, and also different entertainment services in the vicinity. This can be implemented even so that information is updated automatically, i.e. during the trip of the user.

The present invention can be advantageously applied in already existing mobile communication networks and data networks, but also in future data communication services, such as the GPRS service according to the standards of the GSM system.

The information on the location of the user can be determined either by the search terminal 1 or in any other functional part of the system, such as the system services of the mobile communication network. Thus the mobile communication network adds the information on the location of the user to the query message, after which for example the mobile communication network selects on the basis of the location information the most suitable connection server 3, to which the query message is transmitted for handling. In an alternative case, the query form can be routed inter alia on the basis of the user identification to a certain connection server 3.

For data transmission, instead of or in addition to using a mobile communication network, it is also possible to use satellite data transmission, data transmission services offered by broadcasting satellites, or data transmission services available in connection with landline broadcasting, such as digital audio broadcasting (DAB).

The invention is not limited to solely to the embodiments presented above, but it can be varied within the scope of the appended claims.

What is claimed is:

1. Method for the transmission of queried information to a mobile user having a current location and/or travel route, comprising the steps of:
    sending an information query from a user search terminal of the mobile user to obtain specific information from a remote source of information,
    receiving and processing the information query,
    searching the remote source of information for the specific information queried by the information query,
    when found, transmitting the specific queried information from the remote source of information to the user search terminal, and
    receiving and displaying the specific queried information to the mobile user by the user search terminal, and the further steps comprising:
- providing a primary server for receiving and processing the information query and producing a search criterion for conducting the information search, said search criterion being based at least partly on information on the current location and/or travel route of the mobile user included with the information query,
- providing the remote source of information with several information servers for the information search, and
- routing the information query sent by the user search terminal to the primary server, and then to an information server that is found suitable for the information search based at least partly on the current location and/or travel route of the mobile user information of the search criterion, to obtain the specific information from the remote source of information.

2. Method according to claim 1, wherein said information source is provided with at least one user profile data base and further comprising the steps of:
- storing user-specific information in at least one user profile data base; and
- utilizing the information in the user profile data base as an additional search criterion in the information search.

3. Method according to claim 2, comprising the further step of storing user-specific information in the search terminal.

4. Method according to claim 1, wherein said information source is provided with at least one service data base and further comprising the steps of:
- storing service-specific information in at least one service data base; and
- retrieving the service-specific information from said service data base.

5. Method according to claim 1, wherein the information query is sent from said user search terminal on one transmission channel, and the specific information is transmitted to said user search terminal on another channel.

6. Method according to claim 5, wherein said transmissions are via Global System for Mobile Communications Small Message Service.

7. System for transmitting information to a mobile user having a current location and/or travel route, the system comprising:
- a user search terminal for sending an information query to obtain specific information for the mobile user from a remote source of information,
- means for receiving and processing the information query,
- retrieval means, responsive to the processed information query, for retrieving the specific queried information from the remote source of information,
- transmitting means for transmitting the retrieved specific queried information to the user search terminal, and
- means for receiving the retrieved specific queried information and presenting it to the mobile user on the user search terminal, and wherein said retrieval means comprises:
- first means for arranging the information retrieval to be conducted using a search criterion based at least partly on information on the current location and/or travel route of the mobile user included with the information query,
- several servers at the remote source of information for storing information available for retrieval, and
- second means for arranging for the information query to be routed to the first means, and then to a server, from among the several servers, that is found suitable for the information retrieval based at least partly on the current location and/or travel route of the mobile user information of the search criterion, to obtain the specific queried information from the remote source of information.

8. System according to claim 7, further comprising at least one user profile data base for storing user-specific information, and means for arranging the information contained in the user profile data base to be used for the information retrieval.

9. System according to claim 8, further comprising means for arranging the user-specific information to be stored in the search terminal.

10. System according to claim 7, further comprising at least one service data base for storing information on suppliers of the service, and means for arranging the information contained in the service data base to be used in addition to the search criterion in the information retrieval, if necessary.

11. System according to claim 7, wherein said first means comprises at least one connection server, and further comprising means for setting up a data transmission connection between the search terminal and the connection server, and means for setting up a connection between the connection server and the several servers of the remote source of information.

12. System according to claim 7, further comprising means for arranging the transmission of information to be conducted at least partly in a wireless manner.

13. System according to claim 7, wherein:
- said user search terminal comprises means for sending said information query on one transmission channel; and
- said transmitting means comprises means for transmitting said retrieved specific information to the user search terminal on another transmission channel.

14. System according to claim 13, wherein said transmissions are via Global System for Mobile Communications Small Message Service.

15. Mobile station for remotely obtaining specific information for a mobile user, having a current location and/or travel route, from one of several servers containing such information, comprising:
- sending means for sending an information query regarding the specific information to be obtained,
- receiving means for receiving the specific information in response to the query, and
- means for presenting the received specific information to the mobile user, said mobile station for use in a system comprising:
- means, remote from said sending means, for receiving and processing the information query,
- means for retrieving the specific information queried, and
- means for transmitting the retrieved specific information to the receiving means of the mobile station, and wherein the mobile station further comprises:
- means for adding information on the current location and/or travel route of the mobile user to the information query as a search criterion for retrieving the specific information, and the system further comprises:
- several servers containing information of the type to be obtained, and
- means for arranging the information query to be routed to a server, from among the several servers, that is found suitable for retrieving the information queried based at least partly on the current location and/or travel route of the mobile user information of the search criterion, to obtain the specific information therefrom.

16. Mobile station according to claim 11, wherein said means for adding information comprises at least one connection server, and further comprising means for setting up a data transmission connection between the sending and receiving means and the connection server, and means for setting up a connection between the connection server and the several servers.

17. Mobile station according to claim 16, further comprising means for arranging the transmission of information to be conducted at least partly in a wireless manner.

18. Mobile station according to claim 15, further comprising at least one user profile data base for storing user-specific information, and means for arranging the information contained in the user profile data base to be added to the means for adding information on the current location and/or travel route of the mobile user to the information query as a search criterion.

19. Mobile station according to claim 18, further comprising means for arranging the user-specific information to be stored in the mobile station.

20. Mobile station according to claim 11, further comprising at least one service data base for storing information on suppliers of the service, and means for arranging the information contained in the service data base to be used in addition to the search criterion in the information retrieval.

* * * * *

UNITED STATES PATENT AND TRADEMARK OFFICE
CERTIFICATE OF CORRECTION

PATENT NO. : 6,154,745

DATED : 11/28/00

INVENTOR(S) : Janne Kari; Heikki Rautila

It is certified that error appears in the above-identified patent and that said Letters Patent is hereby corrected as shown below:

Col. 17, line 40, Claim 6, "Small Message Service" should read
--Short Message Service--.

Col. 18, line 22, Claim 11, after "server" insert --and at least one remote server--.

Col. 18, line 40, Claim 14, "Small Message Service" should read
--Short Message Service--.

Signed and Sealed this

Twenty-fourth Day of April, 2001

Attest:

NICHOLAS P. GODICI

Attesting Officer

Acting Director of the United States Patent and Trademark Office